(No Model.)
F. J. BECKER
CORN PLANTER.
No. 538,947. Patented May 7, 1895.
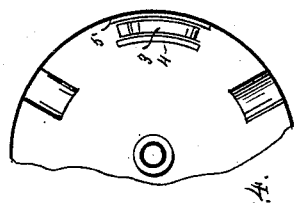
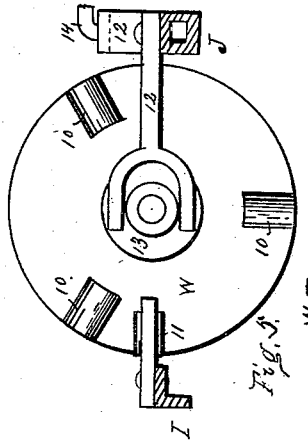
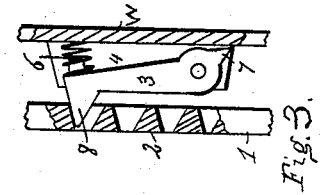
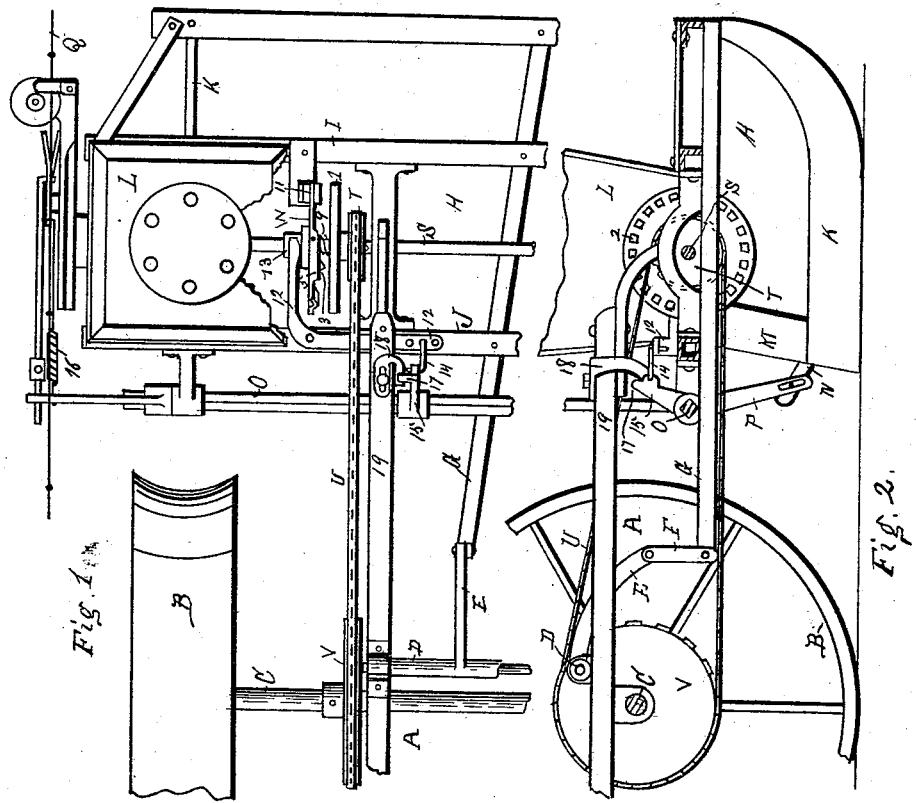
WITNESSES,
J. E. Hancock
J. J. Richardson
Frank J. Becker,
INVENTOR.
By Robert S. Carr, ATT'Y.

UNITED STATES PATENT OFFICE.

FRANK J. BECKER, OF HAMILTON, OHIO, ASSIGNOR TO THE H. P. DEUSCHER COMPANY, OF SAME PLACE.

CORN-PLANTER.

SPECIFICATION forming part of Letters Patent No. 538,947, dated May 7, 1895.

Application filed October 8, 1894. Serial No. 525,260. (No model.)

*To all whom it may concern:*

Be it known that I, FRANK J. BECKER, of Hamilton, Ohio, have invented certain new and useful Improvements in Corn-Planters, of which the following is a specification.

My invention relates to that class of corn planters having a front runner frame surmounted by seed dropping mechanism, and a rear main frame mounted on ground wheels and movably coupled to the runner frame, and the object of my improvement is to provide the seed shaft with an automatic clutch whereby the seed dropping mechanism is intermittently actuated and at intervals proportionate with the spaces between the successive hills of corn dropped by the planter. This object is attained in the following described manner as illustrated in the accompanying drawings, in which—

Figure 1 is a plan of portion of a corn-planter; Fig. 2, a vertical section thereof; Figs. 3, 4, 5, and 6, details of the automatic clutch.

With the exceptions hereinafter indicated the preferable construction of the planter is substantially the same as shown and described in my prior application for a patent filed December 16, 1893, Serial No. 493,818. Any other suitable construction may be adopted if desired.

By reference to Figs. 1 and 2 for a brief general description, A represents the main frame mounted on ground wheels B by means of the rotative axle C.

The usual mechanism to raise or depress the runner frame consists of rocking sleeve or bar D formed with forwardly projecting arms E that are engaged by links F with the hounds G of the runner frame. The sleeve D is actuated by a hand lever (not shown) secured on one of its ends.

The runner frame H consists of transverse bars I and J mounted on runners K. Seed boxes L are mounted on the runner frame over the rear end of the respective runners. They are provided with the usual seed dropping mechanisms that communicate with the runners through the seed spouts M. Check valves N intercept the corn in its descent through the seed spouts. They are opened and closed by the oscillation of rock shaft O through the engagement of legs P that depend therefrom, with the projecting heels of the check valves. The rock shaft is operated by a check wire Q by means of the usual check heads attached to the respective seed boxes and engaging with crank arms on said rock shaft.

Rotative shaft S is carried upon the runner frame and is engaged with the seed dropping mechanism in the seed boxes by means of the usual bevel gears. (Not shown.) Sprocket wheel T is mounted to turn idly on the shaft S and is rotated by sprocket chain U that is driven from sprocket wheel V secured on the axle. Clutch W is splined on the shaft S contiguous to sprocket wheel T thereon and by being intermittently engaged with said sprocket wheel imparts intermittent rotary motion to the shaft S and to the seed dropping mechanism in engagement therewith.

Disk 1 is rigidly attached to sprocket wheel T or preferably formed integral therewith. The margin of its face contains an annular series of ratchet teeth 2 for the engagement of pawl 3 on clutch W. Said pawl is pivotally attached to the face of the clutch toward the disk and between lugs 4 and 5 raised thereon. Compression spring 6 under the pawl forces it outwardly from the face of the clutch to retain it in engagement with the ratchet teeth on the disk and to permit it to become automatically disengaged therefrom when the disk is rotated in a rearward direction. Heel 7 on the pawl limits the outward movement of its rearward end 8. Compression spring 9 is coiled around the shaft S and interposed between the disk and the clutch. Its function is to move the clutch axially on said shaft in a direction from the disk to disengage the pawl from the ratchet teeth and thus discontinue the rotary motion of the clutch.

The margin of the rear surface of the clutch presents an even surface that is intercepted at equal intervals by concave depressions 10 formed therein to serve as temporary seats for roller 11. Said roller is mounted on transverse bar I of the runner frame and adjusted to track on the marginal surface of the clutch during its engagement with the disk of the sprocket wheel T. When the clutch is advanced in its rotation until one of the cavities 10 registers with roller 11 the action of spring 9 moves the clutch in a direction from the disk, disengages the pawl 3 therefrom and seats the roller 11 in the cavity 10. In this manner the clutch is automatically disengaged from the disk, its rotary motion discontinued and it is retained motionless by the roller.

Bell crank 12 is pivoted at its elbow to transverse bar J of the runner frame. One of its ends is bifurcated to straddle the shaft S and to press against hub or boss 13 of the clutch. The opposite extremity of said bell crank lever 12 is provided with several holes for the engagement therewith of connecting rod 14. Vertical arm 15 rigidly secured on the rock shaft O is pivotally connected with the opposite extremity of connecting rod 14.

When the rock shaft is oscillated in a rearward direction by the action of the check wire in the usual manner, for the purpose of opening the check valves in the seed spouts, it actuates the bell crank lever to move the clutch axially on the shaft S toward the disk 1 and effect its engagement therewith by the contact of the pawl with the ratchet teeth. This movement of the clutch by the bell crank lever simultaneously releases roller 11 from cavity 10 and permits the clutch to rotatively advance with the sprocket wheel T until the succeeding cavity 10 reaches the roller and permits the expansion of spring 9 to automatically move the clutch out of engagement with the sprocket wheel and seat the roller in the cavity. The action of the check wire in oscillating the rock shaft to open the check valves is but momentary and said valves are quickly closed by spring 16 in reversing the oscillation of the rock shaft. The movement of the rock shaft by the check wire is sufficient to cause the bell crank lever to move the clutch into engagement with the sprocket wheel and retain it in engagement therewith until the clutch has begun its rotary motion and the roller rests on the plane marginal surface between cavities 10. In this position the roller retains the clutch in engagement with the sprocket wheel after the lever 12 has discontinued its action thereon and until the next cavity arrives at and receives the roller.

The intermittent engagement of the clutch with the sprocket wheel by means of the knots on the check wire actuates the seed dropping mechanism to deposit a single hill of corn in the seed spouts during the passage under roller 11 of the portion of the clutch between adjacent cavities therein.

The closing of the check valves precedes the descent of the hill of corn in the seed spouts and intercepts its descent to the furrow until the valves are opened by the action of the succeeding knot of the check wire.

The planter may be arranged to drill the corn instead of planting it in hills by simply dispensing with the use of the check wire and locking the rock shaft in a position to keep the check valves open and to retain the clutch in continuous engagement with the idle driven sprocket wheel T. For this purpose boss 17 is formed integral on one side and near the end of arm 15, and stop 18 is adjustably secured on side rail 19 of the main frame to engage with said boss and lock the rock shaft in a position to hold the check valves open and retain the clutch in continuous engagement with the sprocket wheel on the shaft S. The edge of the stop 18 that engages with boss 17 is situated in an inclined position to the arc described by the side rail 19 of the main frame and the hound G of the runner frame during the raising or depressing of the runner frame. When the runner frame is raised the movement of said boss upward along the inclined edge of the stop unlocks the rock shaft and permits it to close the check valves and to allow the clutch to become disengaged from the driven sprocket wheel to discontinue the action of the seed dropping mechanism. In this manner the planter when used as a drill is automatically thrown out of gear when the runner frame is raised from the ground and automatically thrown in gear when it is again depressed.

The seed dropping mechanism preferably consists of the usual disk plates containing marginal perforations of the proper size to each drop a sufficient number of grains of corn at one time to form a hill of corn and known as a full hill drop. The distance between the perforations in the disk plates should be properly proportioned in relation to the speed of the plates to cause them to deposit the corn in the seed spouts with the successive engagements of the clutch with the driven sprocket wheel and immediately succeeding the closing of the check valves by the rock shaft.

The power to drive the seed dropping mechanism is thus properly derived from the traction of the ground wheels and the intermittent action of said dropping mechanism is controlled by the check wire without increasing its ordinary duty or submitting it to too great a strain.

Having fully described my improvement, what I claim as my invention, and desire to secure by Letters Patent, is—

1. In a corn planter, the combination, with the runner frame, of a shaft journaled thereon, a continuously rotatable wheel on the shaft, provided with a series of notches in one face, a clutch upon the shaft movable toward and from the wheel, the outer face of which is provided with radial depressions, a pivoted tooth in the inner face of the clutch and adapted to engage with the wheel, a roller journaled to fit within one of the notches when the clutch is out of engagement with the wheel, and means for automatically moving the clutch, substantially as set forth.

2. In a corn planter, the combination, with a runner frame, of a shaft journaled thereon, a continuously rotatable wheel on the shaft, provided with a series of notches in one face, a spring actuated clutch adjacent to the wheel, the outer face of which is provided with a series of radial depressions, a tooth in the inner face of the clutch adapted to engage with the teeth of the wheel, a roller mounted upon the frame adjacent to the outer face of the clutch and adapted to enter one of the depressions when the clutch is out of engagement with the wheel, and means for moving the clutch toward the wheel, substantially as set forth.

3. In a corn planter, the combination, with the runner frame, of an operating and a rock shaft journaled thereon, a continuously rotatable wheel and a spring actuated clutch on the operating shaft, the clutch being provided with means for engaging with the wheel, a bell crank lever pivotally secured to the frame with one end in engagement with the clutch, an arm on the rock shaft, and a rod for connecting the arm with the lever, substantially as set forth.

FRANK J. BECKER.

Witnesses:
 ROBERT S. CARR,
 C. J. PARRISH.